United States Patent Office 3,847,893
Patented Nov. 12, 1974

---

3,847,893
PROCESS FOR THE PREPARATION OF INSULIN DERIVATIVES CROSS-LINKED BY A DICARBOXYLIC ACID GROUP AT THE AMINO A–1 GLYCINE AND AMINO B–29 LYSINE
Dietrich Brandenburg, Schmithof, uber Aachen, and Walter Puls, Wuppertal, Germany, assignors to Bayer Aktiengesellschaft, Leverkusen, Germany
Filed Feb. 16, 1973, Ser. No. 333,366
Claims priority, application Germany, Mar. 1, 1972, P 22 09 836.8
Int. Cl. A61k *17/04;* C07c *103/52;* C07g *7/00*
U.S. Cl. 260—112.7
9 Claims

ABSTRACT OF THE DISCLOSURE

Insulin derivatives in which the A–1 and B–29 free amino groups are crosslinked by a bridge of the formula —CO—X—CO— in which X is a carbon-carbon bond or an aliphatic group are prepared by (1) reacting (a) the amino group of the A–1 glycyl group of an insulin A chain derivative in which the four mercapto groups are protected and (b) the amino group of the B–29 lysyl group of an insulin B-chain derivative in which the two mercapto groups are protected, with a dicarboxylic acid derivative and then, after removal of the protecting groups, (2) closing three disulfide bonds of the six cystinyl groups.

---

Figure 1:
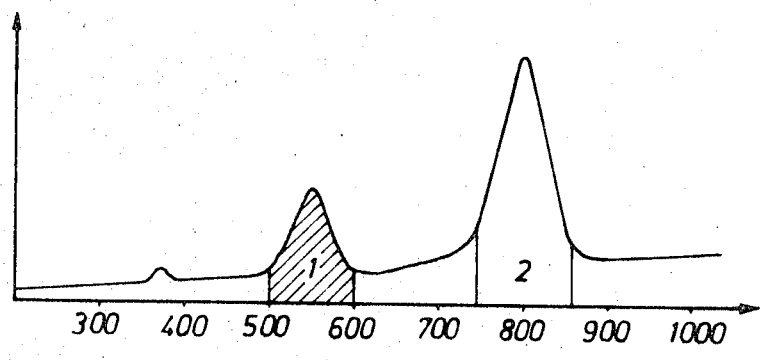

The present invention pertains to a process for the preparation of new monomeric insulin derivatives in which the A- and B-chains are crosslinked via the A–1 and B–29 amino groups. The products prepared according to this process are described in greater detail in Ser. No. 333,361, filed Feb. 16, 1973.

It is known that insulin can be chemically modified by means of various monofunctional reagents. Some of these derivatives can be isolated in the homogeneous form and possess modified biological properties, see, e.g., Levy et al., Biochemistry, *6*, 3559 (1967); Lindsay et al., Biochem. J., *121*, 737 (1971); and Africa et al., Biochemistry, *9*, 1962 (1970). In the reaction of insulin with bifunctional reagents on the other hand, it has generally hitherto been possible to obtain only heterogeneous mixtures without a single reaction product; see e.g., DDR Pat. 10,002; Zahn et al., Makromol. Chem., *26*, 153 (1958). In these cases, the bifunctional reagent appears to react with the various functional groups of the insulin molecule. In addition to monomeric derivatives, higher-molecular products with an indeterminate degree of polymerization are also produced.

The invention described in copending application Ser. No. 333,361 provides new biologically active insulin derivatives in which the α-amino group of glycine A–1 of the A-chain is bifunctionally crosslinked to the ε-amino group of lysine B–29 of the B-chain by a group of the formula:

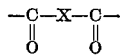

in which X is a direct carbon-carbon bond or an aliphatic hydrocarbon chain with 1–15 C atoms, of which one or more carbon atoms are optionally replaced by one or more heteroatoms or groups of heteroatoms, and either unsubstituted or substituted by hydrophilic groups.

This invention provides a process for the production of these compounds in which the insulin A-chain and a separate insulin B-chain are reacted with an activated derivative of a dicarboxylic acid of the general formula:

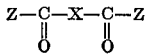

in which

X is as defined above, and
Z is a radical that activates the carboxylic acid groups of the acid, in a polar organic solvent or in a mixture of an organic solvent and water, in the presence of a proton acceptor and, after removal of the protecting groups, combining the sulfide groups to form the disulfide links.

It is known that the insulin A-chain can be combined with the insulin B-chain through formation of the disulfide bonds and that insulin is thereby obtained, although in low yields. In these processes, however, two separate chains are combined. Although theoretically a very large number of disulfides could result, each containing A- and B-chains in different molar ratios, in practice, combination products of polymeric B-chain-disulfides and oligomeric A-chain-disulfides result as the principal products with a low yield of insulin. By combining the reduced B-chain with an excess of reduced A-chain, the yield of insulin can be increased; see Y.-c. Du et al., Scientia Sinica, *14*, 229 (1965). Even when using a five-fold molar excess of A-chain, however, it is only possible to isolate 26% of insulin if natural chains are employed; see Katsoyannis et al., Biochemistry, *6*, 2642 (1967). With synthetic chains, the yields are even lower.

It is also known that in the *in vitro* oxidation of reduced pro-insulin, see Steiner et al., Proc. Nat. Acad. Sci. U.S.A., *60*, 622 (1968), pro-insulin is reformed in a yield of 50 to 80%. Pro-insulin is the single-chain precursor of insulin in biosynthesis. High combination yields of synthetic insulin could be in principal achievable via a synthetic pro-insulin but no synthetic pro-insulin has to date been disclosed, an experimental effort requiring the synthesis of a sequence of 30 to 33 amino acids. Pro-insulin itself is biologically barely active and must be split enzymatically to give insulin in further reaction steps, a specific splitting enzyme for which has not yet been found.

In the present process, an insulin A-chain derivative of the simplified formula:

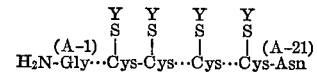

in which Y is a removable sulphur-protecting group is reacted with an excess of an activated derivatives of a dicarboxylic acid of the formula:

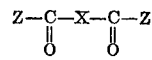

in which

X is as defined above, and
Z represents a residue activating the carbonyl group in a polar organic solvent and in the presence of a proton acceptor to produce an insulin A-chain derivative monofunctional-substituted on the amino group of the A–1 glycine. This derivative is then reacted with an insulin B-chain derivative of the simplified formula:

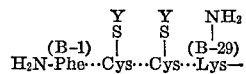

in which Y is as defined above.

At this stage, the derivative can be diagrammatically depicted by the simplified formula:

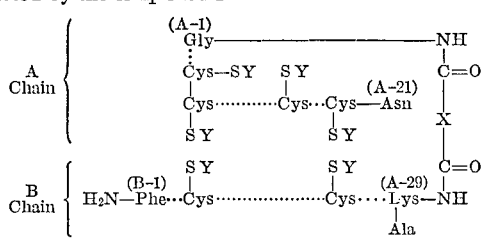

In the above formula, which has been modified from the conventional format for graphic convenience, X and Y are as herein defined.

In the next stage of the process, the mercapto protecting group, are removed under conditions which depend upon the nature of those groups.

Finally the six mercapto groups are oxidatively closed in aqueous alkaline medium to produce the bridge insulin derivative described in the above referred-to copending application. Surprisingly the six mercapto groups combine preferentially to form disulfide bonds corresponding to those found in natural insulin.

The new compounds thus produced are preferably purified to remove accompanying by-products and other impurities by a separation process which differentiates the products according to molecular weight.

It is surprising that the insulin A-chain can be linked with the insulin B-chain between the A-1 amino groups of glycine and B-29 lysine in such a controlled manner and high yield without the need for temporary protection of the amino group of the B-1 phenylalanine. It could be expected from the art, that substitution at the phenylalanine would also occur to a considerable extent; see e.g., Levy et al., Biochemistry, 6, 3559 (1967) and Lindsay et al., Biochem. J., 121, 737 (1971). It is equally unexpected the side-reactions at the hydroxy groups of the tryrosine and serine radicals do not occur; see, e.g., Zahn et al., Angew. Chem., 75, 377 (1963).

Likewise it is surprising that in the oxidation, specific formation of the disulfide bonds between the half-cystine radicals A-6 and A-11, A-7 and B-7, and A-20 and B-19 takes place and that the insulin derivatives is obtained in high yield. While it could have been assumed that under dilution conditions it would be possible to repress the formation of polymeric disulfides, it would have also been expected that in view of the numerous statistically possible combinations, the monomeric products would consist of a mixture of numerous isomers with only a small part of the desired insulin being obtained.

Use of the present process provides a number of advantages relative to known insulin syntheses. The specific linking of A- and B-chains proves possible in high yield without side-reactions and without the necessity for protection of the phenylalanine amino group. Unreacted B-chain is recovered in high yield. The specific formation of the insulin-disulfide bonds can be achieved in substantially higher yield than hitherto. Finally the bridge between the amino groups does not have to be removed in a further reaction step so as to isolate insulin itself since the crosslinked insulins are themselves biologically active.

The individual A- and B-chains can be derived from beef insulin, human insulin, sheep insulin, pig insulin, whale insulin or fish insulin through known methods such as oxidative sulfitolysis; see e.g., Bailey et al., J. Biol. Chem., 234, 1733 (1959), or synthesized by known peptide methods; see e.g., Zahn et al., Z. Naturforsch., 216, 763 (1966) and Zahn et al., Tetrahedron Letters, 5095 (1967). The two chains which are combined can be but need not be from the same source. Although the A-1 glycine group in the A-chain and the B-29 lysine group in the B-chain must naturally be free, remaining groups can be unprotected, except for the mercapto groups, or protected through conventional techniques well known in peptide syntheses.

The group Y may similarly be any of the conventional sulfide protecting groups. The bis sulfonate group ($Y=SO_3$) is highly satisfactory as is the ethylthio group; see e.g., Weber, Hoppe-Seyler's Z. Physiol. Chem., 350, 1421 (1961).

Suitable activated derivatives of dicarboxylic acids are known or can be readily manufactured according to known processes; e.g., Zahn et al., Chem. Ber., 96, 1747 (1963); Schnell et al., Kolloid-Z, 203, 27 (1965); Zahn et al., Forschungsber. des Landes Nordrhein-Westfalen, No. 1897, Brandt, Ed., Westdeutscher Verlag, Cologne and Opladen (1967). The preferred derivatives in which Z is a substituted phenoxy group can be prepared from the dicarboxylic acid, the appropriately substituted phenol, and dicyclohexylcarbodiimide.

Examples of these activated derivatives include adipic acid bis-p-nitrophenyl ester, pimelic acid bis-N-hydroxy-succinimide ester, suberic acid bis-2,4,5-trichlorophenyl ester, azelaic acid bis-pentachlorophenyl ester and the like.

The reaction of the two chains and the dicarboxylic acid derivative is preferably performed in one or more polar organic solvent in which the insulin chains dissolve. Dimethylsulfoxide and dimethylformamide are completely satisfactory. The proton acceptor includes all the basic compounds which are customarily employed in peptide as, for example, triethylamine or N-methylmorpholine. The temperatures are usually in the range of from about 0 to about 40° C.

The subsequent steps of removing the protective groups and formating the disulfide bonds are conducted in an aqueous, optionally buffered medium. As proton acceptors, one can employ amonium or alkali metal hydroxides, bicarbonates or carbonates such as sodium hydroxide, ammonium bicarbonate and sodium carbonate, as well as buffer substances, such as tris (hydroxymethyl) aminomethane or glycine, and organic bases such as methylamine. Examples of reducing agents which can be used in removal of the protecting groups are mercaptans such as β-mercaptoethanol or thioglycollic acid. This reduction can also be carried out electrolytically.

A typical denaturing agent is urea. Oxidation of the mercapto group can be accomplished with atmospheric oxygen.

The temperatures used in the reduction step are generally between 0 and 100° C. In the formation of the disulfide bonds by oxidation, the temperatures are between 0 and 30° C.

A typical procedure for carrying out the process of the invention is as follows. The chain derivative of the formula

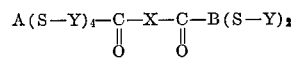

is generally prepared by adding dropwise to a vigorously stirred solution of 5 to 20 mmoles of the activated dicarboxylic acid derivative at a concentration of 0.05 to 0.2 mole/l. in an organic solvent, a solution of 1 mmole of insulin A-chain with reversibly protected SH groups and preferably 5 to 10 mmoles of acid-binding agent, for example triethylamine, in the organic solvent. The dicarboxylic acid derivative reacts mono-functionally with the amino group of the A-chain to give an activated A-chain derivative which is isolated by precipitation, for example with methanol/ether (1:10), generally 15 to 30 minutes after completion of the addition of the dicarboxylic acid derivative. The isolated A-chain derivative is thoroughly washed, as for example with methanol/ether.

The activated A-chain derivative is then dissolved in the organic solvent, preferably the same as used in the first step, the concentration preferably being 10 to 20 μmole/ml. This solution is slowly added dropwise, preferably over the course of 30 minutes, to a stirred solution of 1 to 5, preferably 1.2 to 1.3, equivalents of insulin B-chain, for example B-chain-bis-S-sulfonate and 5 to 15, preferably approximately 7 mmole/base per mmole of B-chain, at a concentration of, preferably 5 to 10 μmole of B-chain/ml.

After a further reaction time of about 15 to 20 hours with stirring, the reaction product is isolated by a process which effects separation according to the molecular weight or the charge, or if necessary by a combination of both. Typically, chromatography is carried out on Sephadex G–50 fine in 0.05 ammonium bicarbonate solution.

The removal of the mercaptan protective groups Y, for example the S-sulfonate groups, and the oxidation of the mercapto groups is carried out by a process based on that given by White, Methods in Enzymology, 11, 481 (1967) for ribonuclease. A solution of the chain derivatives at a concentration between 2 and 5 μmole/ml. is reacted with an excess of a reducing agent (40 to 200 mole of the reducing agent per mole of substituted sulphur group), preferably a mercaptan such as mercapto-ethanol, in the presence of a denaturing agent such as urea, at pH values between 7 and 9, preferably pH 8.5, and at a temperature of between 0 and 40° C., preferably about 25° C., for between 3 and 10 hours. The reduced chain derivative is then isolated by precipitation, as by the addition of a water-miscible organic solvent at an acidic pH to avoid any oxidation of the mercapto groups by means of acetone/hydrochloric acid according to White, J. Biol. Chem., 236, 1353 (1961), or by gel filtration in an acid medium.

The final insulin derivatives are formed by oxidation of the reduced chain derivatives under dilution conditions such as from 0.01 and 0.05, preferably 0.02 μmole of chain derivative per ml., preferably in an alkaline medium between pH 7.5 and pH 10.8, especially at pH 8.5 to 9.0 and at temperatures between 0 and 30° C., preferably between 18 and 25° C. The insulin derivatives can be isolated by freeze-drying and separation according to molecular weight, for example on Sephadex G–50 fine in 10% strength acetic acid.

As described in greater detail in the above referred-to application, the insulin derivatives obtained according to the present process have blood glucose lowering ability. These derivatives can be diagrammatically depicted by the following formula:

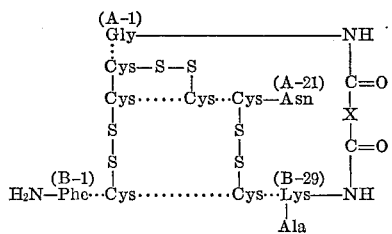

wherein X is carbon-carbon bond or an alkylene chain containing 1 to 15 carbon atoms, from 0 to 2 of said carbon atoms being replaced by a corresponding number of sulfur, oxygen or imino groups, said alkylene chain being unsubstituted or substituted by one or two amino groups. X is preferably a carbon-carbon bond or an alkylene group of from 1 to 15 carbon atoms, most preferably, the group —(CH$_2$)$_n$— where $n$ has a value of 1 to 15.

EXAMPLE 1

$N^{A-1}, N^{B-29}$-adipoly-A-chain-tetra-S-sulfonate-B-chain-bis-S-sulfonate

A solution of 28 mg. (approximately 10 μmole) of beef insulin A-chain in the tetra-S-sulfonate form in 1.5 ml. of dimethylsulfoxide and 7 μl. of triethylamine was added dropwise over the course of 15 minutes, at room temperature and with vigorous stirring to a solution of 38.8 mg. (100 μmole) of adipic acid bis-p-nitrophenyl ester in 1 ml. of dimethylsulfoxide. The reaction mixture was stirred for a further 15 minutes at room temperature. The A-chain derivative was then precipitated by adding ether which contained 10% of methanol, centrifuged off and repeatedly washed with ether. The residue was dissolved in 1 ml. of dimethylsulfoxide and added dropwise over the course of 30 minutes, with vigorously stirring to a solution of 100 mg. of beef insulin B-chain (approximately 27 μmole) in the bis-S-sulfonate form and 25 μl. of triethylamine in 4 ml. of dimethylsulfoxide. The reaction mixture was stirred for a further 4 hours at room temperature and then dialyzed for one hour against running water and twice for one hour at a time against 1 lier of 0.05 M ammonium bicarbonate solution (pH 8.2). The solution was then applied to a column (3 x 200 cm.) of Sephadex G–50 fine, equilibrated in the same solvent, and chromatographed (FIG. 1).

The following were obtained after freeze-drying:

Fraction 1 (shaded): 29.3 mg. (44% of theory) of $N^{A-1}, N^{B-29}$-adipoly-A-chain-tetra - S - sulfonate - B-chain-bis-S-sulfonate Fraction 2: 65 mg. of B-chain-bis-S-sulfonate.

Analysis of Fraction 1:

Paper electrophoresis at pH 2: purity 90%

$R_A$ (relative mobility of the band relative to A-chain-tetra-S-sulfonate)=0.4

UV-spectrum, extinction at 276 nm.: $\epsilon_{276}$=5,600.

FIG. 1 shows the elution diagram of gel chromatography of the crude product from the synthesis in Example 1 in Sephadex G–50 fine (column dimensions 3 x 200 cm.) in 0.05 M ammonium bicarbonate solution of pH 8.2.

Flow speed: 90 ml./hour
Abscissa: elution volume in ml.
Ordinate: extinction at 254 nm. (nanometers)
(1) Maximum (shaded): $N^{A-1}, N^{B-29}$-adipoyl-A-chain-tetra-S-sulfonate-B-chain-bis-S-sulfonate
(2) Maximum: unreacted B-chain-bis-S-sulfonate.

EXAMPLE 2

$N^{A-1}, N^{B-29}$-azelaoyl-A-chain-tetra-S-sulfonate-B-chain-bis-S-sulfonate

A solution of 70 mg. (26 μmole) of A-chain in the S-sulfonate form and 20 μl. of triethylamine in 4 ml. of dimethylsulfoxide was added dropwise over the course of 20 minutes to a solution of 107.5 mg. (250 μmole) of azelaic acid bis-p-nitrophenyl ester in 3 ml. of dimethylsulfoxide, with vigorous stirring. After further stirring for 20 minutes, the derivative was precipitated with methanol/ether (1:10), centrifuged off, thoroughly washed with methanol/ether and briefly dried in vacuo.

The A-chain derivative was dissolved in 1.5 ml. of dimethylsulfoxide and the solution was added dropwise over the course of 30 minutes, with vigorous stirring to a solution which contained 115 mg. (32 μmole) of B-chain in the S-sulfonate form and 30 μl. of triethylamine in 5 ml. of dimethylsulfoxide. The mixture was stirred for a further 3½ hours at room temperature an then dialyzed for one hour against running water and twice for one hour at a time against 1 liter of 0.05 M ammonium bicarbonate solution. Thereafter the solution (25 ml.) was applied to a column (3 x 200 cm.) with Sephadex G–50 and chromatographed as described in Example 1.

Yields:

Fraction 1: 64 mg. (39.2% of theory of $N^{-A1}, N^{B-29}$-azelaoyl - A-chain-tetra-S-sulfonate-B-chain-bis-S-sulfonate Fraction 2: 54 mg. of B-chain-bis-S-sulfonate.

Analysis of Fraction 1:

UV-spectrum, extinction at 276 nm.: $\epsilon_{276}$=5,340
$R_A$=0.5
Electrophoretic purity: 95%.

EXAMPLE 3

$N^{A-1},N^{B-29}$-suberoyl-A-chain-tetra-S-sulfonate-B-chain-bis-S-sulfonate

A solution of 135 mg. (50 μmole) of A-chain-tetra-S-sulfonate (from beef insulin) and 40 μl. of triethylamine in 7 ml. of dimethylsulfoxide was added dropwise over the course of 20 minutes at room temperature, with vigorous stirring to a solution of 208 mg. (500 μmole) of suberic acid bis-p-nitrophenyl ester in 6 ml. of dimethylsulfoxide. The reaction mixture was further stirred for 20 minutes at room temperature and then worked up as described in Example 1. The residue was dissolved in 3.5 ml. of dimethylsulfoxide and added dropwise over the course of 30 minutes at room temperature, with vigorous stirring to a solution of 230 mg. (62 μmole) of B-chain-bis-S-sulfonate in 10 ml. of dimethylsulfoxide and 60 μl. of triethylamine. The reaction solution was stirred for a further 17 hours at room temperature and then dialyzed and chromatographed as described in Example 1. After freeze-drying, the following were obtained:

Fraction 1: 153.4 mg. (48% of theory) of $N^{A-1},N^{B-29}$-suberoyl-A-chain-tetra-S-sulfonate-B-chain-bis-S-sulfonate Fraction 2: 64 mg. B-chain-bis-S-sulfonate.

Analysis of Fraction 1:
UV-spectrum, extinction at 276 nm.: $\epsilon_{276} = 5,450$
$R_A = 0.43$
Electrophoretic purity: >95%.

EXAMPLE 4

$N^{A-1},N^{B-29}$-adipoylinsulin 60 mg. (approximately 8.5 μmole) of the crosslinked chain derivative $N^{A-1},N^{B-29}$-adipoyl-A-chain-tetra-S-sulfonate-B-chain-bis-S-sulfonate prepared in Example 1 were dissolved in 3 ml. of 8 M urea solution and the solution was adjusted to pH 8.6 with methylamine. Nitrogen was then passed through it for 10 minutes, 200 μl. (2.9 mmol) of β-mercaptoethanol were added and nitrogen was again passed through for 10 minutes. After a reduction time of three and a half hours, the solution was cooled to approximately 0° C. and the protein was precipitated with a mixture of cold acetone and 1 N HCl (in the ratio of 39:1), centrifuged off, twice washed with cold ether and briefly dried in vacuo.

The reduction chain derivative was dissolved in 2 ml. of 1 N ammonia and the solution was diluted with 600 ml. of ammonium bicarbonate solution. After adjusting the pH value to 8.5–8.6 the solution was oxidized by leaving it to stand in air at room temperature. After 5 days it was lyophilized.

Weighing: 141 mg., protein content (spectroscopically determined: approximately 36%).

135 mg. were dissolved in 2 ml. of glacial acetic acid and 8 ml. of water and the insoluble part (16.7 mg. after drying) was centrifuged off. The supernatant liquid was applied to a column (3 x 200 cm.) of Sephadex G–50 fine which was equilibrated with 10% strength acetic acid, and was chromatographed in the same solvent. The eluate under the maximum (see FIG. 2) was dialyzed three times against 1 liter of distilled water at a time and subsequently lyophilized.

Yield: 31.6 mg. (57.5% of theory at a protein content of 90%).

Analysis of the adipoylinsulin.—UV-spectrum, extinction at 278 nm.: $_{278} = 5,540$.

Cellulose acetate electrophoresis at pH 2: a sharp band with the same mobility as authentic adipoylinsulin, $R_{Ins}$ (mobility, realtive to insulin) = 0.74.

The preparation crystallizes from citrate buffer containing zinc salt, according to Schlichtkrull, Acta Chem. Scand., 10, 1455, 1956, in the same spherical crystal form as a parallel sample from authentic adipoylinsulin.

Figure 2:
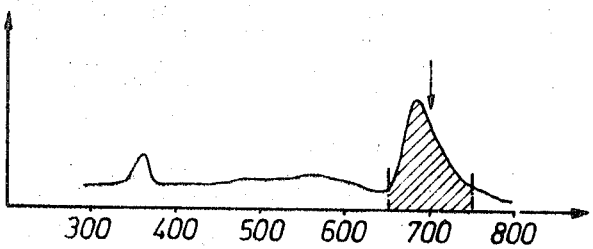

FIG. 2 shows the elution diagram of the gel chromatography of the oxidation product from Example 4 on a column of Sephadex G–50 fine (dimensions 3 x 200 cm.) in 10% strength acetic acid. Flow speed 35 ml./hour.

Abscissa: elution volume in ml.
Ordinate: extinction at 254 nm. (nanometers).

The fraction with a miximum at 685 ml. (shaded) contains $N^{A-1},N^{B-29}$-adipoylinsulin.

The arrow parallel to the ordinate is intended to mark the position of the absorption maximum in the case of natural beef insulin (at 700 ml.).

EXAMPLE 5

$N^{A-1},N^{B-29}$-adipoylinsulin 50 mg. (approximately 7 μmole) of the crosslinked chain derivative $N^{A-1},N^{B-29}$-adipoyl-A-chain-tetra-S-sulfonate-B-chain-bis-S-sulfonate of Example 1 were dissolved in 3 ml. of deaerated 8 M urea solution containing 200 μl. (2.9 mmole) of β-mercaptoethanol and adjusted to pH 8.6 with methylamine. The pH value was readjusted to pH 8.6 with methylamine, nitrogen was passed through the solution for 10 minutes, and the reaction vessel was closed. After reduction for 4 hours at room temperature the reduced protein was isolated as described in Example 4 and dried. It was then dissolved in 2.5 ml. of 1 N ammonia and the solution was diluted with 500 ml. of ammonium bicarbonate solution of pH 8.2. After adjusting the pH value to 9.0 the solution was oxidized by leaving it to stand in air at room temperature under occasional magnetic stirring, until SH-groups could no longer be detected. The pH value was controlled and readjusted in 24 hour intervals. After 180 hours, the solution was acidified with glacial acetic acid to pH 4.1, which led to the formation of a fine precipitate, and lyophilized.

The residue was dissolved in 2 ml. of glacial acetic acid and 8 ml. of water. Complete dissolution was effected by the addition of a small amount of urea. The clear solution was chromatographed as described in Example 4. The eluate under the maximum (shaded area, compare FIG. 2) was diluted with an equal volume of water and lyophilized.

Yield: 35.2 mg. (77.6% of theory at a protein content of 90%).

Analysis of the adipoylinsulin: $\epsilon_{278} = 5,950$.

Electrophoresis on cellulose acetate (pH 2); single substance $R_{Ins} = 0.84$.

What is claimed is:

1. A process for the preparation of a bifunctionally crosslinked insulin derivative in which the amino group of the A-1 glycine is linked to the ε-amino group of the B-29 lysine by a bridge of the formula:

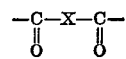

in which X is a carbon-carbon bond, alkylene of 1 to 15 carbon atoms, or alkylene of 1 to 15 carbon atoms wherein 1 carbon atom is replaced by sulphur, oxygen or imino, said alkylene being unsubstituted or substituted by one or two hydrophilic groups which comprises the steps of reacting an insulin A-chain in which the four free mercapto groups have been protected, with an activated derivative of a dicarboxylic acid of the formula:

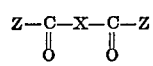

in which X is as above defined and Z is a suitable acid activating group, to produce an insulin A-chain derivative monofunctionally substituted on the amino group of the A-1 glycine, reacting said derivative with an insulin B-chain in which the two free mercapto groups have been protected, to yield a compound of the formula:

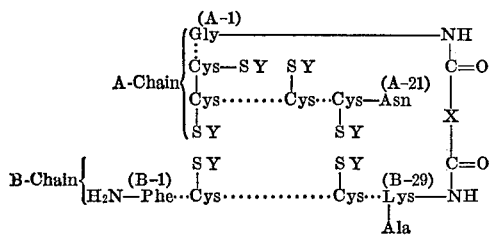

in which X is as above defined and Y is the mercapto protecting group, removing the mercapto protecting groups, and oxidizing the mercapto groups in an aqueous alkaline medium to form disulfide bonds.

2. A process according to claim 1 in which the insulin produced is purified by differentiation of the reaction product according to molecular weight.

3. A process according to claim 1 in which both the A- and B-chains are of beef insulin.

4. A process according to claim 1 in which Y is $SO_3^-$.

5. A process according to claim 1 in which Z is phenoxy.

6. A process according to claim 1 in which X is an alkylene group of the formula $-(CH_2)_n-$, in which $n$ is an integer from 1 to 15.

7. A process according to claim 1 in which the reaction of the insulin A-chain derivative and the insulin B-chain is carried out at 0 to 40° C.

8. A process according to claim 1 in which the removal of the mercapto protecting groups is carried out at 0 to 100° C.

9. A process according to claim 1 in which formation of the disulfide bonds is carried out at 0 to 30° C.

References Cited
UNITED STATES PATENTS

| | | | |
|---|---|---|---|
| 3,679,653 | 7/1972 | Schuck et al. | 260—112.7 |
| 3,420,810 | 1/1969 | Katsoyannis et al. | 260—112.7 |

LEWIS GOTTS, Primary Examiner

R. J. SUYAT, Assistant Examiner